Dec. 26, 1922.
V. W. PAGÉ.
MAIN BEARING LUBRICATOR.
FILED NOV. 22, 1921.
1,440,314.
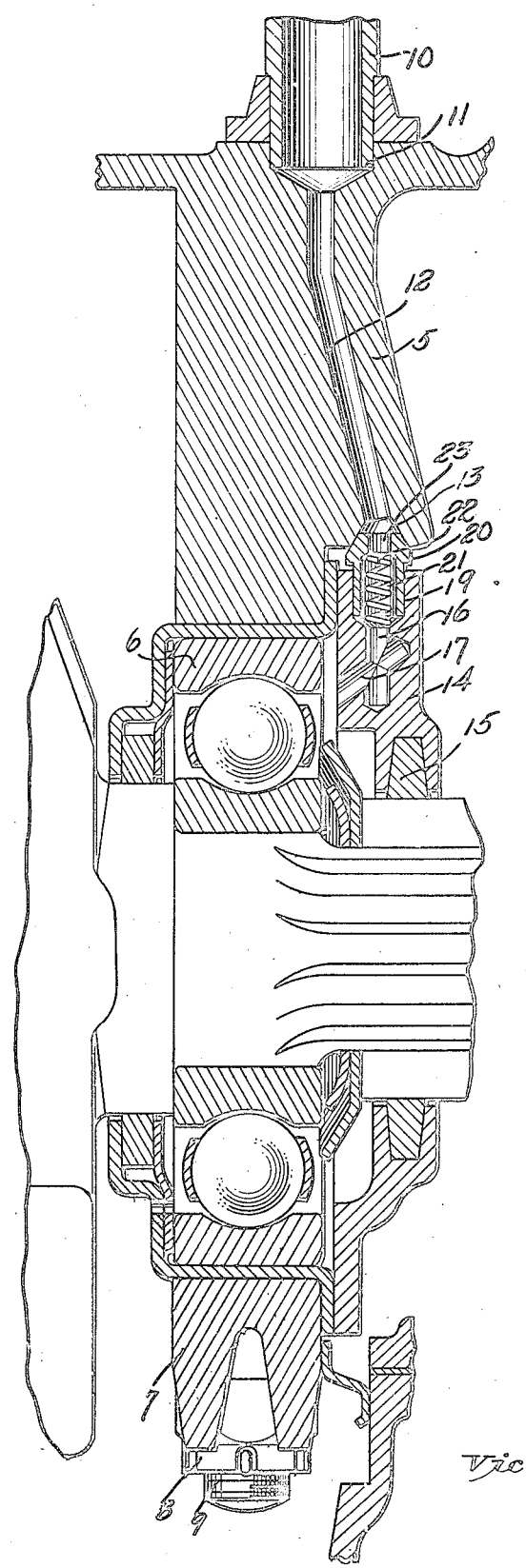
WITNESSES
INVENTOR
Victor W. Pagé
BY
ATTORNEYS Patented Dec. 26, 1922.

1,440,314

UNITED STATES PATENT OFFICE.

VICTOR W. PAGÉ, OF NEW YORK, N. Y.

MAIN-BEARING LUBRICATOR.

Application filed November 22, 1921. Serial No. 517,035.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Main-Bearing Lubricator, of which the following is a full, clear, and exact description.

The present invention relates to new and useful improvements in internal combustion motors, and it pertains more particularly to a lubricating means therefor.

It is one of the primary objects of the invention to provide a new and improved lubricating means for the main bearing of an internal combustion motor.

It is a further object of the invention to construct the lubricating means in such a manner that as the main bearing or crank shaft of the motor is removed and replaced, an automatic positioning of the lubrication duct is had.

It is a still further object of the invention to provide a new and improved means for conveying the lubricant from the lubricating system to the main bearing.

With the above and other objects in view, reference is had to the accompanying drawings, in which the figure is a sectional view of a portion of an internal combustion motor illustrating the present invention.

Referring more particularly to the drawings, the reference character 5 designates the base of the cylinder block, and 6 designates the main bearing. This main bearing is held in place by means of a cap 7, and nuts 8 adapted for engagement with bolts or the like 9. The bearing is of the anti-friction type, but it is to be here stated that the device set forth in this application is not limited to main bearings of this type but is capable of use with any form of main bearing.

The reference character 10 designates a hollow member projecting downwardly from the cam shaft housing, which latter is not shown, and said hollow member is engaged as at 11, with the upper portion of the cylinder block base 5. The base 5 of the cylinder block is provided with a passage 12 which extends downwardly thereof and terminates in a flared or tapered-outlet 13.

The reference character 14 designates a ring-like member adapted to carry a packing of felt or other suitable material 15, and said ring-like member 14 is provided with a vertical passage 16 and an angularly disposed passage 17, which latter is projected in the direction of the main bearing 6. The upper end of the vertical passage 16 terminates in an enlarged recessed portion 19, and mounted in said recessed portion 19 is a nipple 20. This nipple is hollow as indicated by the reference character 21, and mounted in the hollow portion thereof is a coil spring 22. Leading from the enlarged portion 21 is an opening 23, and said opening 23 is positioned in alinement with the passages 12 and 16.

From the foregoing construction it is apparent that when the main bearing 6 is removed permitting a dropping of the crank shaft, the ring-like member 14 is likewise moved away from the base 5 of the cylinder block. As this action takes place, the nipple 20 will disengage the enlarged portion 13 of the passage 12. When, however, the main bearing is replaced and the crank shaft lifted into position, the nipple 20 will engage the enlarged portion 13 of the passage 12 and will automatically center within said enlarged portion 13 and thus complete the passage of the oil, which is as follows:

From the passage 12, through the opening 23, to the enlarged portion 21 of the nipple 20, and from thence into the passages 16 and 17 from which latter the oil is discharged to the main bearing.

It is apparent from the above that the main bearing is lubricated from the cam shaft housing and that the passage for conveying the lubricant from the cam shaft housing to the main bearing is so arranged that upon removal and replacement of the main bearing and crank shaft, a clear passage for the lubricant is automatically established.

I claim:

1. A mechanism of the class described comprising in combination, a bearing, a bearing support, said bearing support being provided with a lubricant passage, a packing ring, and means carried by the packing ring and adapted for removable engagement with the bearing support, said means establishing communication between the lubricant passage and the bearing, substantially as described.

2. A mechanism of the class described comprising in combination, a bearing, a bearing support provided with a lubricant passage, said passage having an enlarged end portion, a ring provided with passages, and means carried by said ring and adapted to establish communication between the passages therein and the lubricant passage of the bearing support, said means being received within the enlarged end of the lubricant passage.

3. A mechanism of the class described comprising in combination, a bearing, a bearing support provided with a lubricant passage terminating in an enlarged end, a ring, lubricant passages provided in said ring and a spring-pressed nipple carried by the ring and adapted for reception within the enlarged portion of the lubricant passage of the bearing support to establish communication between said passage and the passages of said ring.

4. A mechanism of the class described comprising a bearing, a support therefor, said support having a lubricant passage terminating in a flared end portion, a ring provided with lubricant passages adapted to discharge lubricant in proximity to said bearing, and a nipple carried by said ring and adapted for engagement in the enlarged portion of the passage of the bearing support, as and for the purpose set forth.

VICTOR W. PAGÉ.